UNITED STATES PATENT OFFICE.

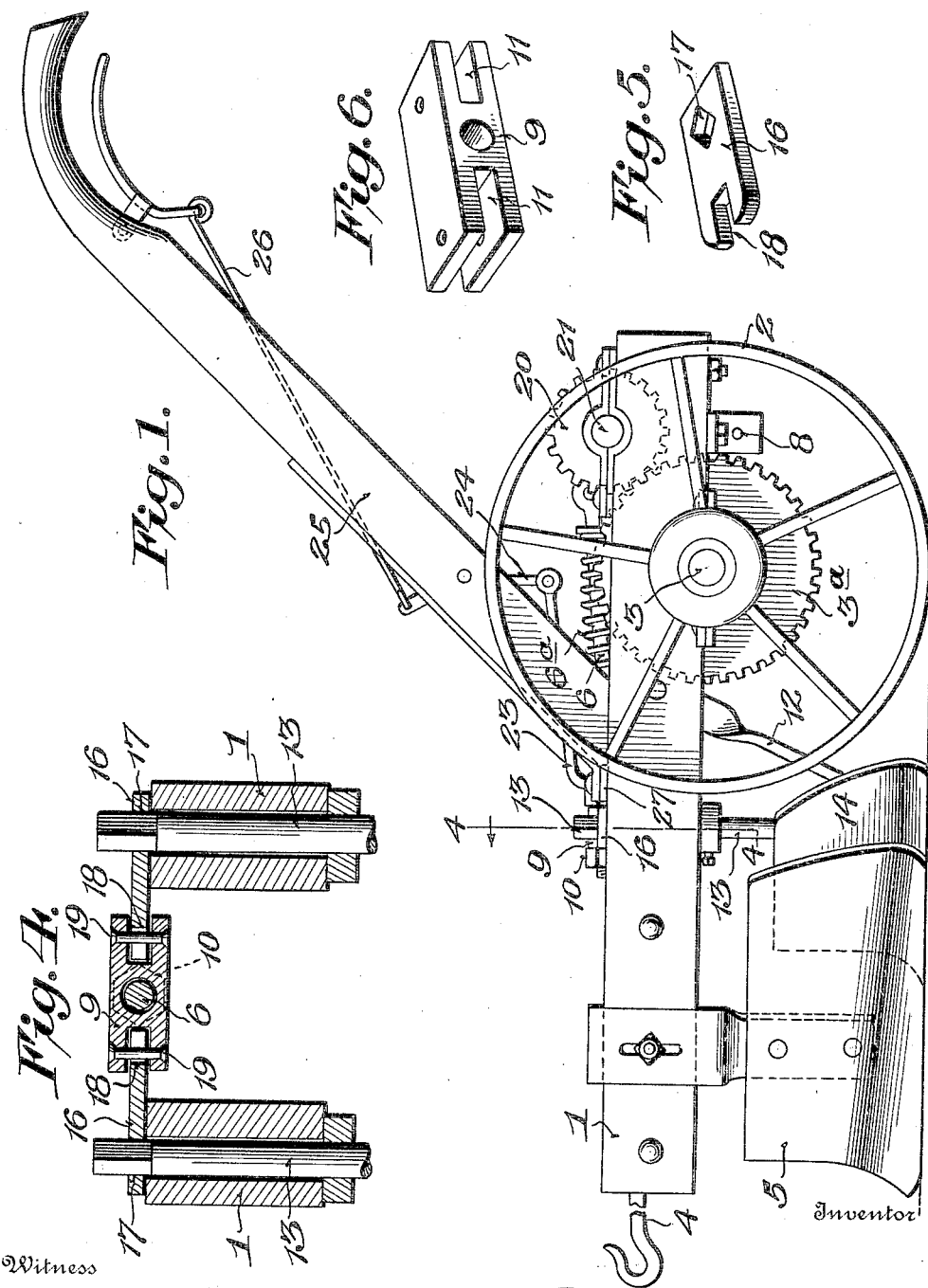

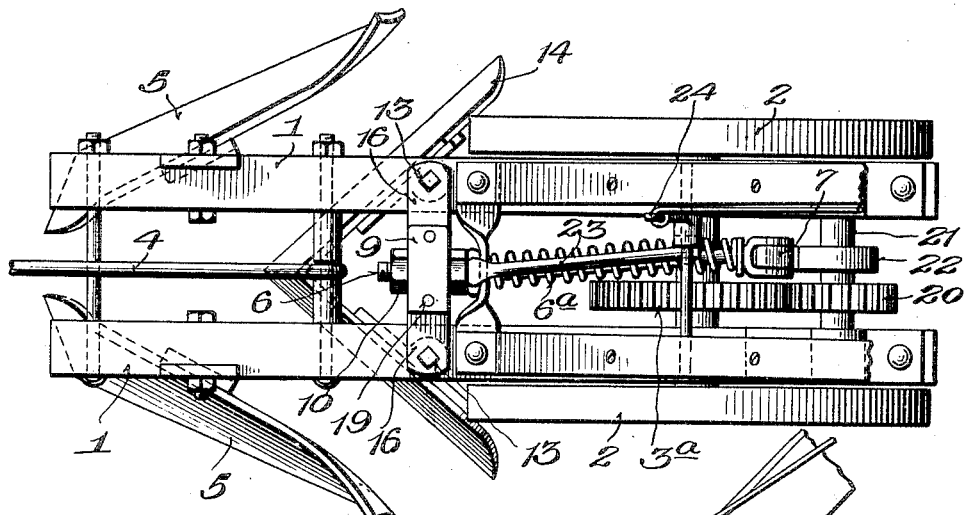
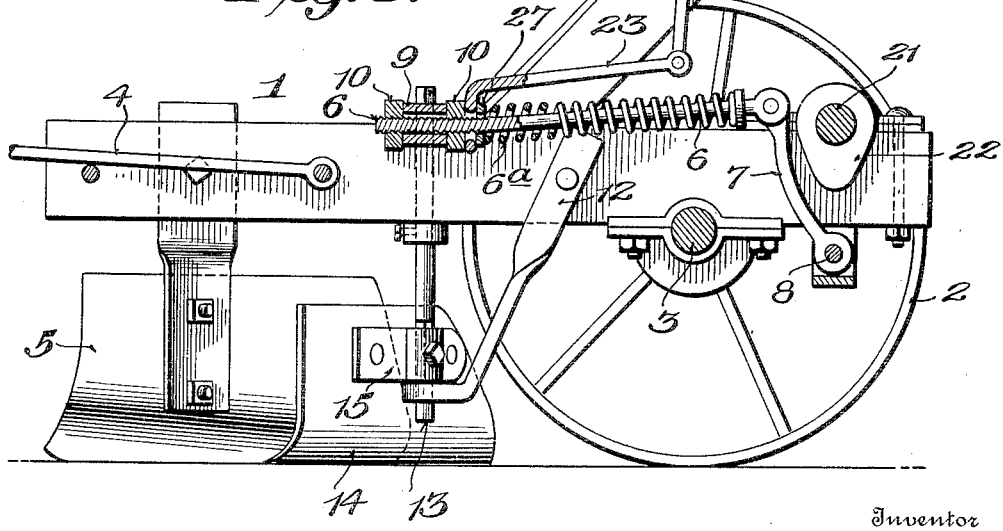

BYON NICHOLS, OF WATERLOO, SOUTH CAROLINA.

COTTON CHOPPING AND THINNING DEVICE.

1,319,412.     Specification of Letters Patent.     Patented Oct. 21, 1919.

Application filed July 27, 1918. Serial No. 247,002.

*To all whom it may concern:*

Be it known that I, BYON NICHOLS, a citizen of the United States, residing at Waterloo, in the county of Laurens and State of South Carolina, have invented certain new and useful Improvements in Cotton Chopping and Thinning Devices, of which the following is a specification.

The invention relates to a cotton chopping or thinning device. The device operates on the scraper principle except that in such devices it is the usual custom to run them crosswise of the rows, whereas my device travels along the row automatically taking out the plants for a predetermined distance, then the scraper blades opening and allowing one plant to stand, and then closing and removing the plants throughout another portion of the row. The advantages of this are two-fold; it leaves the plants spaced equal distances apart, which is not always the case with a crosswise drag, and it enables cultivation or cleaning of the rows during the chopping operation.

The invention consists of the novel features of construction hereinafter described, pointed out in the claim and shown in the accompanying drawings, in which—

Figure 1 is a side elevation.

Fig. 2 is a plan view.

Fig. 3 is a vertical, longitudinal section of the device taken between the parallel beams.

Fig. 4 is a section on the line 4—4 of Fig. 1.

Figs. 5 and 6 are detail views of certain operating blocks, detached.

In the drawings 1 designates parallel beams spaced apart and supported by wheels 2 on an axle 3. A drawbar 4 is connected to the device for draft purposes. Cultivator or cleaning blades 5 are carried by the beams respectively and work along opposite sides of the row.

A rod 6 has its rear end pivotally connected to a link 7, arranged between the beams, and pivoted at its lower end to a rod 8 supported from and below the beams.

The forward threaded end of the rod 6 passes through a block 9 the opposite sides of which are provided with deep grooves 11, the rod being secured by nuts 10.

To depending brackets 12 carried by the beams are secured vertical rods 13. The scraper or chopping blades 14 are pivotally mounted on these rods by securing plates 15. Blocks 16 having square openings 17 adjacent one end and notched as at 18 adjacent the opposite ends are mounted on the upper squared portions of the rods 13.

Blocks 9 and 16 coöperate, the blocks 16 being placed on opposite sides of the blocks 9 with their notched ends extending into the grooves 11. Pins 19 pass through the block 9 and across the grooves and through the notches of blocks 16.

A coil spring $6^a$ is mounted on the rod 6, normally holding it in rearward position. A gear wheel $3^a$ mounted to rotate with the axle 3 meshes with a gear wheel 20 fixed on a shaft 21 which carries a cam 22 placed to engage the link 7.

The operation of these parts is as follows:

When the spring $6^a$ holds the rod 6 in rearward position the blades 14 have their front edges in contact as shown in Fig. 2. Traveling along the row, on a line midway the path of travel of the cultivators 5, these meeting edges clean and thin out the plants and grass along the row. But during each rotation of the cam 22 it will engage the link 7 and force the rod 6 forward carrying the block 9 with it. The pins 19 being in engagement with the notches 18 the blocks 16 will swing at an angle to each other, giving a partial rotation to the rods 13 and swinging the blades 14 away from each other. This opening of the blades will permit standing any plant in the row passed by the blades while they are in open position. As the point of the cam ceases to hold the rod 6 in forward position the spring $6^a$ returns the parts to normal position, and the blades resume chopping or thinning operation. It is understood that the blades travel a greater distance in closed operative position than in open position.

When desired the device can be operated by hand to leave standing any selected plant that would otherwise be cut out. To accomplish this I connected an angled bar 23 to the rod 6, and pivot the rear end of the bar to a link 24 pivoted midway its ends to a handle stock 25, a pull wire 26 being connected to the upper end of the link.

By pulling on the pull wire the rod 6 is forced forward independent of the movement or position of the cam.

The use and advantages of a device of this type will be obvious to those experienced in the handling of implements of this character and the growing of cotton.

The device can be used for the chopping out of other crops, such as corn, if desired, and is not limited to use in connection with cotton cultivation alone.

It will also be understood that the fixed blades 5 traveling in advance of the scrapers 14 will throw up a ridge for the latter to travel and work on.

The throw of the blades 14 can be regulated by adjusting the nuts 10 thereby shortening or lengthening the rod 6 in its longitudinal movement.

What I claim is:

A device of the kind described comprising parallel beams, a block movable longitudinally between said beams, a rod secured to said block, a cam adapted to force said rod in one direction at regular intervals, a spring for returning the block and rod to normal position, depending rods carried by the beam, cutting blades carried by the rods, blocks secured to the upper ends of the rods, and means carried by the first mentioned block for engaging and swinging the second mentioned blocks on longitudinal movement of the first mentioned rod.

In testimony whereof I affix my signature.

BYON NICHOLS.

Copies of this patent may be obtained for five cents each, by addressing the "Commissioner of Patents, Washington, D. C."